(12) United States Patent
Watanabe et al.

(10) Patent No.: US 9,855,466 B2
(45) Date of Patent: Jan. 2, 2018

(54) GOLF BALL

(71) Applicant: Bridgestone Sports Co., Ltd., Minato-ku, Tokyo (JP)

(72) Inventors: Hideo Watanabe, Saitamaken (JP); Tsuyoshi Nakajima, Saitamaken (JP); Yuichiro Ozawa, Saitamaken (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 52 days.

(21) Appl. No.: 14/974,405

(22) Filed: Dec. 18, 2015

(65) Prior Publication Data

US 2016/0199701 A1 Jul. 14, 2016

Related U.S. Application Data

(63) Continuation-in-part of application No. 14/934,445, filed on Nov. 6, 2015, which is a continuation of application No. 14/016,801, filed on Sep. 3, 2013, now Pat. No. 9,211,445.

(51) Int. Cl.
*A63B 37/06* (2006.01)
*A63B 37/08* (2006.01)
*A63B 37/00* (2006.01)
*C08L 21/00* (2006.01)

(52) U.S. Cl.
CPC ........ *A63B 37/0051* (2013.01); *A63B 37/006* (2013.01); *A63B 37/0033* (2013.01); *A63B 37/0063* (2013.01); *A63B 37/0064* (2013.01); *A63B 37/0065* (2013.01); *A63B 37/0066* (2013.01); *C08L 21/00* (2013.01); *A63B 37/0068* (2013.01); *A63B 37/0074* (2013.01); *A63B 37/0075* (2013.01); *A63B 37/0076* (2013.01)

(58) Field of Classification Search
USPC ................................. 473/351–377
See application file for complete search history.

(56) References Cited

U.S. PATENT DOCUMENTS

| | | | | |
|---|---|---|---|---|
| 4,650,193 A * | 3/1987 | Molitor | ............ | A63B 37/0003 264/265 |
| 4,726,590 A * | 2/1988 | Molitor | ............ | A63B 37/02 473/372 |
| 5,033,748 A * | 7/1991 | Ebisuno | ............ | A63B 37/0003 473/371 |
| 5,184,828 A * | 2/1993 | Kim | ............ | A63B 37/0003 473/373 |
| 5,403,010 A * | 4/1995 | Yabuki | ............ | A63B 37/0003 473/372 |
| 5,695,413 A | 12/1997 | Yamagishi et al. | | |
| 5,731,371 A * | 3/1998 | Nesbitt | ............ | C08F 279/02 473/371 |
| 5,733,977 A * | 3/1998 | Takemura | ............ | A63B 37/0003 473/372 |
| 5,743,817 A | 4/1998 | Yamagishi et al. | | |
| 5,776,012 A * | 7/1998 | Moriyama | ............ | A63B 37/0003 473/372 |
| 5,813,924 A | 9/1998 | Yamagishi et al. | | |
| 5,816,944 A * | 10/1998 | Asakura | ............ | A63B 37/0003 473/372 |
| 5,929,171 A * | 7/1999 | Sano | ............ | A63B 37/0003 473/372 |
| 6,220,972 B1 * | 4/2001 | Sullivan | ............ | A63B 37/0003 473/373 |
| 6,602,941 B2 * | 8/2003 | Higuchi | ............ | A63B 37/0003 473/357 |
| 6,786,836 B2 * | 9/2004 | Higuchi | ............ | A63B 37/0003 473/351 |
| 6,835,779 B2 * | 12/2004 | Voorheis | ............ | A63B 37/0003 473/377 |
| 6,919,393 B2 * | 7/2005 | Mano | ............ | A63B 37/0003 473/371 |
| 7,083,532 B2 * | 8/2006 | Ohama | ............ | A63B 37/0003 473/371 |
| 7,387,581 B2 * | 6/2008 | Higuchi | ............ | A63B 37/0087 473/378 |
| 7,455,602 B2 * | 11/2008 | Sato | ............ | A63B 37/0004 473/383 |
| 7,481,722 B2 * | 1/2009 | Higuchi | ............ | A63B 37/0003 473/377 |
| 7,695,379 B2 * | 4/2010 | Higuchi | ............ | A63B 37/0003 473/377 |
| 7,727,085 B2 * | 6/2010 | Higuchi | ............ | A63B 37/0033 473/377 |
| 7,897,694 B2 * | 3/2011 | Rajagopalan | ...... | A63B 37/0003 473/371 |
| 8,021,249 B2 * | 9/2011 | Higuchi | ............ | A63B 37/0004 473/384 |
| 8,313,395 B2 * | 11/2012 | Sullivan | ............ | A63B 37/0062 473/373 |
| 8,367,779 B1 * | 2/2013 | Ozawa | ............ | C08K 5/098 525/331.9 |
| 8,648,133 B2 * | 2/2014 | Ozawa | ............ | C08K 5/405 473/372 |
| 8,657,704 B2 * | 2/2014 | Ohama | ............ | A63B 37/0003 473/371 |
| 8,734,273 B2 * | 5/2014 | Tachibana | .......... | A63B 37/0003 473/371 |

(Continued)

FOREIGN PATENT DOCUMENTS

| | | | |
|---|---|---|---|
| JP | 10-85367 A | 4/1998 | |
| JP | 11-035633 A | 2/1999 | |

(Continued)

*Primary Examiner* — Alvin Hunter
(74) *Attorney, Agent, or Firm* — Sughrue Mion, PLLC

(57) ABSTRACT

The invention provides a golf ball having a core and a cover of one layer or a plurality of layers, the core being formed of a material molded under heat from a rubber composition containing: (A) a base rubber, (B) an organic peroxide, and (C) water and/or a metal monocarboxylate. The core has a hardness profile which satisfies specific relationships between the JIS-C hardness at the core center (Cc), the JIS-C hardness at a position 10 mm from the core center (C10) and the JIS-C hardness at the core surface (Cs).

20 Claims, No Drawings

(56) References Cited

U.S. PATENT DOCUMENTS

| | | | |
|---|---|---|---|
| 8,802,788 B2 * | 8/2014 | Nakajima | C08K 5/175 473/351 |
| 8,882,610 B2 * | 11/2014 | Matsuyama | A63B 37/0031 473/376 |
| 8,998,749 B2 * | 4/2015 | Tarao | A63B 37/0003 473/373 |
| 9,199,130 B2 * | 12/2015 | Fushihara | A63B 37/0063 |
| 9,211,445 B2 * | 12/2015 | Nakajima | A63B 37/006 |
| 2003/0038399 A1 * | 2/2003 | Scolamiero | B29C 35/0222 264/236 |
| 2003/0100383 A1 * | 5/2003 | Jordan | A63B 37/0003 473/371 |
| 2004/0214661 A1 * | 10/2004 | Sullivan | A63B 37/0003 473/371 |
| 2005/0004325 A1 * | 1/2005 | Wu | A63B 37/00 525/462 |
| 2005/0154132 A1 * | 7/2005 | Hakuta | C08K 5/0025 525/105 |
| 2006/0073913 A1 * | 4/2006 | Castner | A63B 37/0003 473/371 |
| 2012/0302373 A1 | 11/2012 | Nanba et al. | |

FOREIGN PATENT DOCUMENTS

| | | |
|---|---|---|
| JP | 2002-102388 A | 4/2002 |
| JP | 2003-126300 A | 5/2003 |

* cited by examiner

GOLF BALL

CROSS-REFERENCE TO RELATED APPLICATION

This application is a continuation-in-part of copending application Ser. No. 14/934,445 filed on Nov. 6, 2015, which is a continuation of copending application Ser. No. 14/016,801 filed on Sep. 3, 2013 now U.S. Pat. No. 9,211,445, the entire contents of each of which are hereby incorporated by reference.

BACKGROUND OF THE INVENTION

The present invention relates to a golf ball having a core and a cover of one layer or a plurality of layers. More particularly, the invention relates to a golf ball that provides users whose head speeds are not very fast, such as senior golfers and women golfers, with an excellent distance and a good, soft feel at impact.

In order to enjoy the game of golf, there is a desire among users whose head speeds are not very fast, such as senior golfers and women golfers, to be able to increase the distance traveled by the ball even when hit at a low head speed and for the ball to have a good feel on shots with a driver. For example, many golf balls that optimize the core diameter and the cover thickness and many golf balls that optimize the deflections of the core and ball when compressed under a given load have been proposed. Such golf balls are described in, for example, U.S. Pat. No. 5,695,413, U.S. Pat. No. 5,743,817, U.S. Pat. No. 5,813,924 and U.S. Published Patent Application No. 2012-302373.

However, these golf balls are not fully satisfactory in terms of distance when played by users whose head speed is not very fast. Also, with some of the golf balls proposed above, the ball has a poor feel on impact with a driver, and so these balls cannot be said to satisfy the needs of low head speed golfers.

SUMMARY OF THE INVENTION

It is therefore an object of the invention to provide a golf ball that provides users whose head speeds are not very fast, such as senior golfers and women golfers, with an excellent distance and a good, soft feel at impact.

As a result of extensive investigations, the inventors have discovered that, by forming a golf ball core of a material molded under heat from a rubber composition which includes (A) a base rubber, (B) an organic peroxide and (C) water and/or a metal monocarboxylate, and also, in the hardness profile of this core, letting Cc be the JIS-C hardness at the core center, C10 be the JIS-C hardness at a position 10 mm from the core center and Cs be the JIS-C hardness at the core surface, by having these hardnesses Cc, C10 and Cs satisfy a specific hardness relationship, a core material which undergoes little decrease in resilience over time and little energy loss is obtained. Golf balls in which these core materials are used in the core and which have a cover of one layer or a plurality of layers encasing the core are able, by maintaining a good rebound and having a reduced spin rate, to achieve an increased distance. In particular, they provide users whose head speeds are not very fast with an excellent distance and a good, soft feel at impact.

More specifically, in the inventive golf ball having a core and a cover of one layer or a plurality of layers, decomposition of the organic peroxide within the core formulation can be promoted by the direct addition of water (or a water-containing material) to the core material. It is known that the decomposition efficiency of the organic peroxide within the core-forming rubber composition changes with temperature, and that, starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where water (or a water-containing material) is added directly to the core, because the water acts to promote decomposition of the organic peroxide, radical reactions like that described above can be made to differ at the core center and at the core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and at the core surface differ markedly. It is also possible to obtain a core having different dynamic viscoelastic properties at the core center.

Golf balls containing the above core are able to achieve a reduced spin rate, in addition to which they care capable of having an excellent durability and incurring little change over time in rebound. Moreover, in this invention, by optimizing the above compression and hardness profile, even when the ball is played by users whose head speed is not very high, such as senior golfers and women golfers, a good distance can be achieved on shots with a driver (W#1) and a good, soft feel at impact can be obtained.

When zinc monoacrylate is used instead of the above water, water is generated from the zinc monoacrylate by heat during kneading of the compounding materials. An effect similar to that obtained by the addition of water can thereby be obtained.

Accordingly, the invention provides the following golf ball.

[1] A golf ball having a core and a cover of one layer or a plurality of layers, wherein the core is formed of a material molded under heat from a rubber composition containing the following components A to C:

(A) a base rubber,
(B) an organic peroxide, and
(C) water and/or a metal monocarboxylate, and has a hardness profile which, letting Cc be the JIS-C hardness at a center of the core, C10 be the JIS-C hardness at a position 10 mm from the core center and Cs be the JIS-C hardness at a surface of the core, satisfies the following conditions (1) to (3):

(1) $0 \leq C10 - Cc \leq 10$
(2) $C10 - Cc < Cs - C10$
(3) $20 \leq Cs - C10$ (with the proviso that Cc is at least 50 and Cs is not more than 80).

[2] The golf ball of [1], wherein the core has a deflection E when compressed under a final load of 1,275 N (130 kgf) from an initial load state of 98 N (10 kgf) of at least 4.4 mm, and the ball has a deflection B when compressed under a final load of 1,275 N (130 kgf) from an initial load state of 98 N (10 kgf) of at least 3.8 mm.

[3] The golf ball of [2], wherein the value E/B is at least 1.08 and not more than 1.20.

[4] The golf ball of [1], wherein the value obtained by dividing the deflection E (mm) of the core when compressed under a final load of 1,275 N (130 kgf) from an initial load state of 98 N (10 kgf) by the thickness C (mm) of the cover, which value is expressed as E/C, is at least 2.7 and not more than 3.9.

[5] The golf ball of [1], wherein the relationship between the diameter D (mm) of the core and the thickness C (mm) of the cover, expressed as the value D/C, is at least 20.

[6] The golf ball of [1], wherein the relationship between the diameter D (mm) of the core and the thickness C (mm) of the cover, expressed as the value D/C, is at least 24 and not more than 41.

[7] The golf ball of [1] wherein, in the core hardness profile, the difference between the JIS-C hardnesses at the core surface and the core center, expressed as the value Cs−Cc, is at least 21.

[8] The golf ball of [1], wherein the core, following vulcanization, has a higher moisture content at the core center than at the core surface.

[9] The golf ball of [1], wherein the difference between the crosslink density at the core surface and the crosslink density at the core center, both of which are crosslink densities measured based on a toluene swelling test, is at least $8.0 \times 10^2$ mol/m$^3$.

[10] The golf ball of [1], wherein the product P×E of the difference P (mol/m$^3$) in crosslink density between the core surface and the core center, as measured based on a toluene swelling test, multiplied by the deflection E (mm) of the core when compressed under a final load of 1,275 N (130 kgf) from an initial load state of 98 N (10 kgf) is at least $28 \times 10^2$ mol/m$^3$·mm.

DETAILED DESCRIPTION OF THE INVENTION

The invention is described more fully below.

The golf ball of the invention has a core and a cover of one layer or a plurality of layers. The core is not limited only to one layer and may, if necessary, be constructed of two or more layers. The core is formed of a material molded under heat from a rubber composition containing as the essential ingredients the following components A to C:

(A) a base rubber,
(B) an organic peroxide, and
(C) water and/or a metal monocarboxylate.

The base rubber serving as component A is not particularly limited, although the use of polybutadiene is especially preferred.

It is desirable for the polybutadiene to have a cis-1,4 bond content on the polymer chain of at least 60 wt %, preferably at least 80 wt %, more preferably at least 90 wt %, and most preferably at least 95 wt %. If the content of cis-1,4 bonds among the bonds on the polybutadiene molecule is too low, the resilience may decrease.

The content of 1,2-vinyl bonds included on the polybutadiene is typically not more than 2%, preferably not more than 1.7%, and more preferably not more than 1.5%, of the polymer chain. If the content of 1,2-vinyl bonds is too high, the resilience may decrease.

The polybutadiene has a Mooney viscosity (ML$_{1+4}$ (100° C.)) of preferably at least 20, and more preferably at least 30, with the upper limit being preferably not more than 120, more preferably not more than 100, and even more preferably not more than 80.

The term "Mooney viscosity" used herein refers to an industrial indicator of viscosity (JIS K6300) measured with a Mooney viscometer, which is a type of rotary plastometer. This value is represented by the unit symbol ML$_{1+4}$ (100° C.), wherein "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

The polybutadiene used may be one synthesized using a rare-earth catalyst or a group VIII metal compound catalyst. In this invention, the use of a polybutadiene synthesized with a rare-earth catalyst is especially preferred. Where necessary, an organoaluminum compound, an alumoxane, a halogen-containing compound and a Lewis base may optionally be used in combination with such a catalyst. In the practice of the invention, preferred use may be made of, as the various foregoing compounds, those mentioned in JP-A 11-35633.

Of the above rare-earth catalysts, the use of a neodymium catalyst that uses in particular a neodymium compound, which is a lanthanum series rare-earth compound, is especially recommended. In such cases, a polybutadiene rubber having a high cis-1,4 bond content and a low 1,2-vinyl bond content can be obtained at an excellent polymerization activity.

A polybutadiene rubber synthesized with a catalyst differing from the above lanthanum rare-earth compound may be included in the base rubber. In addition, styrene-butadiene rubber (SBR), natural rubber, polyisoprene rubber, ethylene-propylene-diene rubber (EPDM) or the like may also be included. These may be used singly or two or more may be used in combination.

The organic peroxide (component B) used in the invention is not particularly limited, although the use of an organic peroxide having a one-minute half-life temperature of 110 to 185° C. is preferred. A single organic peroxide, or two or more organic peroxides, may be used. The amount of organic peroxide included per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight. A commercially available product may be used as the organic peroxide. Specific examples include those available under the trade names Percumyl D, Perhexa C-40, Niper BW and Peroyl L (all produced by NOF Corporation), and Luperco 231XL (from Atochem Co.).

The water serving as component C in the invention is not particularly limited, and may be distilled water or may be tap water. The use of distilled water free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content in the rubber composition before vulcanization becomes preferably at least 1,000 ppm, and more preferably at least 1,500 ppm. The upper limit is preferably not more than 8,500 ppm, and more preferably not more than 8,000 ppm. When the moisture content of the rubber composition is too low, it may be difficult to obtain a suitable crosslink density and tan δ, which may make it difficult to mold a golf ball having little energy loss and a reduced spin rate. On the other hand, when the moisture content of the rubber composition is too high, the core may be too soft, which may make it difficult to obtain a suitable core initial velocity.

Although it is also possible to add water directly to the rubber composition, the following methods (i) to (iii) may be employed to incorporate water:

(i) applying water in the form of a mist, as steam or by means of ultrasound, to some or all of the rubber composition (compounded material);
(ii) immersing some or all of the rubber composition in water;
(iii) letting some or all of the rubber composition stand for a given period of time in a high-humidity environment in a place where the humidity can be controlled, such as a constant humidity chamber.

As used herein, "high-humidity environment" is not particularly limited, so long as it is an environment capable of moistening the rubber composition, although a humidity of from 40 to 100% is preferred.

Alternatively, the water may be worked into a jelly state and added to the above rubber composition. Or a material obtained by first supporting water on a filler, unvulcanized rubber, rubber powder or the like may be added to the rubber composition. In such a form, the workability is better than when water is directly added to the composition, enabling the efficiency of golf ball production to be increased. The type of material in which a given amount of water has been included, although not particularly limited, is exemplified by fillers, unvulcanized rubbers and rubber powders in which sufficient water has been included. The use of a material which undergoes no loss of durability or resilience is especially preferred. The moisture content of the above material is preferably at least 3 wt %, more preferably at least 5 wt %, and even more preferably at least 10 wt %. The upper limit is preferably not more than 99 wt %, and even more preferably not more than 95 wt %.

In this invention, a metal monocarboxylate may be used instead of the above-described water. Metal monocarboxylates, in which the carboxylic acid is presumably coordination-bonded to the metal, are distinct from metal dicarboxylates such as zinc diacrylate of the formula $(CH_2=CHCOO)_2Zn$. A metal monocarboxylate introduces water into the rubber composition by way of a dehydration/condensation reaction, and thus provides an effect similar to that of water. Moreover, because a metal monocarboxylate can be added to a rubber composition as a powder, the operations can be simplified and uniform dispersion within the rubber composition is easy. In order to carry out the above reaction effectively, a monosalt is required. The amount of metal monocarboxylate included per 100 parts by weight of the base rubber is preferably at least 1 part by weight, and more preferably at least 3 parts by weight. The upper limit in the amount of metal monocarboxylate included is preferably not more than 60 parts by weight, and more preferably not more than 50 parts by weight. When the amount of metal monocarboxylate included is too small, it may be difficult to obtain a suitable crosslink density and tan δ, as a result of which a sufficient golf ball spin rate-lowering effect may not be achievable. On the other hand, when too much is included, the core may become too hard, as a result of which it may be difficult for the ball to maintain a suitable feel at impact.

The carboxylic acid used may be, for example, acrylic acid, methacrylic acid, maleic acid, fumaric acid or stearic acid. Examples of the substituting metal include sodium, potassium, lithium, zinc, copper, magnesium, calcium, cobalt, nickel and lead, although the use of zinc is preferred. Illustrative examples of the metal monocarboxylate include zinc monoacrylate and zinc monomethacrylate, with the use of zinc monoacrylate being especially preferred.

In addition to above-described components A to C, it is possible to also include in the rubber composition: (D) an organosulfur compound, (E) a co-crosslinking agent, and (F) an inert filler. If necessary, an antioxidant may also be included. These ingredients are described in detail below.

(D) Organosulfur Compound

An organosulfur compound may be included in the rubber composition. The organosulfur compound is exemplified by, but not particularly limited to, thiophenols, thionaphthols, halogenated thiophenols, and metal salts thereof. Specific examples include the zinc salts of pentachlorothiophenol, pentafluorothiophenol, pentabromothiophenol and parachlorothiophenol, and diphenylpolysulfides, dibenzylpolysulfides, dibenzoylpolysulfides, dibenzothiazoylpolysulfides and dithiobenzoylpolysulfides having from 2 to 4 sulfurs. These may be used singly or two or more may be used in combination. Of the above, preferred use may be made of the zinc salt of pentachlorothiophenol and/or diphenyldisulfide.

It is recommended that the organosulfur compound be included in an amount, per 100 parts by weight of the base rubber, of preferably at least 0.1 part by weight, more preferably at least 0.2 part by weight, and even more preferably at least 0.5 part by weight, but preferably not more than 5 parts by weight, more preferably not more than 4 parts by weight, and even more preferably not more than 3 parts by weight. If the amount of organosulfur compound included is too large, the material molded under heat from the rubber composition may have a hardness that is too low. On the other hand, if the amount included is too small, an improvement in the resilience may be unlikely to occur.

(E) Co-Crosslinking Agent

The co-crosslinking agent is a metal salt of an α,β-unsaturated carboxylic acid having from 3 to 8 carbons. In the invention, "co-crosslinking agent" refers to a material which lacks the above-described dehydration reaction. Illustrative examples of the α,β-unsaturated carboxylic acid include acrylic acid, methacrylic acid, maleic acid and fumaric acid. Acrylic acid is preferred because it confers a high resilience. The metal of the metal salt is exemplified by zinc, sodium, magnesium, calcium and aluminum, with zinc being especially preferred. Accordingly, zinc acrylate is preferred as the co-crosslinking agent.

The co-crosslinking agent has an average particle size of preferably from 3 to 30 μm, more preferably from 5 to 25 μm, and even more preferably from 8 to 15 μm. When the co-crosslinking agent has an average particle size of less than 3 μm, it tends to aggregate within the rubber composition, as a result of which the reactivity between acrylic acid molecules increases and the reactivity between molecules of the base rubber decreases, which may make it impossible to obtain an acceptable golf ball rebound. On the other hand, when the co-crosslinking agent has an average particle size greater than 30 μm, the co-crosslinking agent particles end up being too large, leading to a large variability in the properties of the resulting golf ball. The co-crosslinking agent is included in an amount per 100 parts by weight of the base rubber which, although not particularly limited, is preferably from 3 to 60 parts by weight, more preferably from 5 to 45 parts by weight, and even more preferably from 20 to 40 parts by weight. If the amount included is less than the above range, the material molded under heat from the rubber composition may be too soft, resulting in a poor resilience. On the other hand, if the amount included is greater than the above range, the material molded under heat from the rubber composition may be too hard, resulting in a poor feel at impact.

As mentioned above, when a metal monocarboxylate is used instead of water in this invention, it is preferable for the relative proportions of the above co-crosslinking agent and the metal monocarboxylate, expressed as the weight ratio therebetween (metal monocarboxylate/co-crosslinking agent), to be within the range of 0.1 to 10.

(F) Inert Filler

Illustrative examples of inert fillers include inorganic fillers such as zinc oxide, barium sulfate and calcium carbonate. The amount of inert filler included per 100 parts by weight of the base rubber is preferably at least 1 part by weight, more preferably at least 3 parts by weight, and even more preferably at least 5 parts by weight. The upper limit is preferably not more than 100 parts by weight, more preferably not more than 60 parts by weight, even more preferably not more than 45 parts by weight, and most preferably not more than 40 parts by weight.

Antioxidant

In this invention, an antioxidant may be optionally included in the rubber composition. For example, use may be made of a commercially available product such as Nocrac NS-6, Nocrac NS-30 or Nocrac 200 (all products of Ouchi Shinko Chemical Industry Co., Ltd.). These may be used singly or two or more may be used in combination. The amount of antioxidant included is not particularly limited, and may be set to preferably at least 0.1 part by weight, and more preferably at least 0.15 part by weight, per 100 parts by weight of the base rubber. The upper limit may be set to preferably not more than 5.0 parts by weight, more preferably not more than 4.0 parts by weight, and even more preferably not more than 3.0 parts by weight. If too much or too little antioxidant is included, an optimal core hardness gradient may not be obtained, which may make it impossible to achieve a good rebound, durability and spin rate-lowering effect on full shots.

The core in this invention can be obtained by using a method similar to that employed in conventional golf ball rubber compositions to vulcanize and cure the above-described rubber composition. Exemplary vulcanization conditions include a vulcanization temperature of between 100 and 200° C. and a vulcanization time of between 5 and 40 minutes.

It is recommended that the core diameter be preferably at least 38.7 mm, more preferably at least 39.1 mm, and even more preferably at least 39.5 mm, with the upper limit being preferably not more than 41.0 mm, more preferably not more than 40.5 mm, and even more preferably not more than 40.1 mm. When the core diameter is smaller than the above values, it may not be possible to obtain a sufficient spin-rate lowering effect and rebound. On the other hand, when the core diameter is larger than the above values, a sufficient spin rate-lowering effect may not be obtainable, in addition to which it may not be possible to obtain the advantageous effects imparted by the cover.

The deflection E of the core (material molded under heat) when compressed under a final load of 1,275 N (130 kgf) from an initial load of 98 N (10 kgf) is not particularly limited, although it is recommended that this be preferably at least 4.4 mm, more preferably at least 4.5 mm, and even more preferably at least 4.6 mm, with the upper limit being preferably not more than 6.0 mm, more preferably not more than 5.5 mm, and even more preferably not more than 5.0 mm. When the core deflection is too much larger than the above values, the core may become too soft, as a result of which the feel of the ball at impact may lack crispness and the durability to cracking on repeated impact may worsen. On the other hand, when the core deflection is too much smaller than the above values, the core may end up being too hard, as a result of which the feel of the ball at impact may be too hard, the spin rate on full shots may be too high and the intended distance may not be achieved.

Next, the hardness profile of the core is described.

The core has a surface hardness Cs which, expressed in terms of JIS-C hardness, is preferably 74 to 80, more preferably 76 to 80, and even more preferably 77 to 80.

The core has a JIS-C hardness C15 at a position 15 mm from the core center which is preferably 68±5, more preferably 68±3, and even more preferably 68±2.

The core has a JIS-C hardness C10 at a position 10 mm from the core center which is preferably 58±5, more preferably 58±3, and even more preferably 58±2.

The core has a JIS-C hardness C5 at a position 5 mm from the core center which is preferably 58±5, more preferably 58±3, and even more preferably 58±2.

The core has a center hardness Cc, expressed in terms of JIS-C hardness which is preferably 55±5, more preferably 55±3, and even more preferably 55±2.

When these hardnesses are higher than the above respective ranges, the feel of the ball may become too lard and the spin rate on full shots may rise, as a result of which a good distance may not be obtained. On the other hand, when these hardnesses are lower than the above respective ranges, the durability to cracking on repeated impact may worsen or the rebound may decrease, as a result of which a good distance may not be obtained.

The value C5−Cc is preferably 5 or less, more preferably 4 or less, and even more preferably 3 or less. When this value is too large, the spin rate on full shots may rise, as a result of which a good distance may not be achieved.

The value C10−Cc is preferably 7 or less, more preferably 6 or less, and even more preferably 5 or less. When this value is too large, the spin rate on full shots may rise, as a result of which a good distance may not be achieved.

The value C15−C10 is preferably from 6 to 14, more preferably from 7 to 13, and even more preferably from 8 to 12. When this value is too large, the durability to cracking on repeated impact may worsen. On the other hand, when this value is too small, the spin rate on full shots may rise, as a result of which a good distance may not be achieved.

The value Cs−C10 is preferably from 15 to 30, more preferably from 17 to 27, and even more preferably from 19 to 24. When this value is too large, the durability to cracking on repeated impact may worsen. On the other hand, when this value is too small, the spin rate on full shots may rise, as a result of which a good distance may not be achieved.

It is critical for the value Cs−C10 to be larger than the value C10−Cc. This signifies that the outside of the core has a steeper hardness gradient than the core interior. That is, the value (Cs−C10)/(C10−Cc) is preferably from 2 to 15, more preferably from 4 to 12, and even more preferably from 6 to 10. When this value is too large, the curability to cracking on repeated impact may worsen. On the other hand, when this value is too small, the spin rate may rise excessively, as a result of which a good distance may not be achieved.

The hardness difference between the surface and center of the core, expressed as the value (Cs)−(Cc), is preferably from 20 to 36, more preferably from 22 to 33, and even more preferably from 24 to 30. When this hardness difference is too large, the durability to cracking on repeated impact may worsen, or the initial velocity of the ball on actual shots may decrease, as a result of which the intended distance may not be achieved. On the other hand, when this hardness difference is too small, the spin rate on actual shots with a driver (W#1) may increase, as a result of which the intended distance may not be obtained.

The center hardness Cc and the cross-sectional hardnesses at specific positions refer herein to the hardnesses measured at the center and specific positions on a cross-section obtained by cutting the core in half (through the center), and the surface hardness Cs refers to the hardness measured at the core surface (spherical surface). Also, "JIS-C hardness" refers to a hardness measured with the spring-type durometer (JIS-C model) specified in JIS K 6301-1975.

Preferably, the initial velocity of the core is faster than the initial velocity of the ball. Specifically, the core initial velocity is preferably at least 77.3 m/s, and more preferably at least 77.6 m/s. When this value is too small, the initial velocity of the finished ball may also be low and the initial velocity on shots with a W#1 may be low, as a result of which the intended distance may not be achieved.

The initial velocity of the core is measured using an initial velocity measuring apparatus of the same type as the USGA drum rotation-type initial velocity instrument approved by the R&A. The core is tested in a chamber at a room temperature of 23±2° C. after being held isothermally in a 23±1° C. environment for at least 3 hours.

In this invention, it is preferable for the core center in the vulcanized core to have a higher moisture content than the core surface. The moisture content of the molded core can be suitably controlled by means of, for example, the amount of water included in the rubber composition, the molding temperature and the molding time.

The moisture content at the core center, although not particularly limited, is preferably at least 1,000 ppm, more preferably at least 1,200 ppm, and even more preferably at least 1,500 ppm. The upper limit is preferably not more than 7,000 ppm, more preferably not more than 6,000 ppm, and even more preferably not more than 5,000 ppm. The moisture content at the core surface, although not particularly limited, is preferably at least 800 ppm, more preferably at least 1,000 ppm, and even more preferably at least 1,200 ppm. The upper limit is preferably not more than 5,000 ppm, more preferably not more than 4,000 ppm, and even more preferably not more than 3,000 ppm. The (core surface moisture content−core center moisture content) value is preferably 0 ppm or below, more preferably −100 ppm or below, and even more preferably −200 ppm or below. The lower limit value is preferably −1,000 ppm or above, more preferably −700 ppm or above, and even more preferably −600 ppm or above.

Measurement of the above moisture content may be carried out with ordinary instruments. For example, the moisture content can be measured using the AQ-2100 coulometric Karl Fischer titrator and the EV-2000 evaporator (both available from Hiranuma Sangyo Co., Ltd.) at a measurement temperature of 130° C., a preheating time of 3 minutes and a background measurement time of 30 seconds.

Next, the crosslink density of the core is explained.

In this invention, the crosslink density at the center of the core is preferably at least $5.0 \times 10^2$ mol/m$^3$, more preferably at least $5.5 \times 10^2$ mol/m$^3$, and even more preferably at least $6.0 \times 10^2$ mol/m$^3$. The upper limit value is preferably not more than $15.0 \times 10^2$ mol/m$^3$, more preferably not more than $14.0 \times 10^2$ mol/m$^3$, and even more preferably not more than $13.0 \times 10^2$ mol/m$^3$. Also, the crosslink density at the surface of the core is preferably at least $13.0 \times 10^2$ mol/m$^3$, more preferably at least $14.0 \times 10^2$ mol/m$^3$, and even more preferably at least $15.0 \times 10^2$ mol/m$^3$. The upper limit value is preferably not more than $30.0 \times 10^2$ mol/m$^3$, more preferably not more than $28.0 \times 10^2$ mol/m$^3$, and even more preferably not more than $26.0 \times 10^2$ mol/m$^3$. The difference in crosslink density between the core center and the core surface, expressed as (crosslink density at core surface)−(crosslink density at core center), is preferably at least $8.0 \times 10^2$ mol/m$^3$ and preferably not more than $30.0 \times 10^2$ mol/m$^3$. If the crosslink density at the core center or the core surface falls outside of the above ranges, the water within the rubber composition may not fully contribute to decomposition of the organic peroxide during vulcanization, as a result of which a sufficient spin rate-lowering effect on the ball may not be obtained.

The crosslink density can be measured by the following procedure.

A flat disk having a thickness of 2 mm is cut out by passing through the geometric center of the core. Next, using a punching machine, samples having a diameter of 3 mm are punched from the flat disk at the core center and at places of measurement not more than 4 mm inward of respective sites corresponding to the core surface, and the sample weights are measured with an electronic balance capable of measurement in units of two decimal places (mg). The sample and 8 mL of toluene are placed in a 10 mL vial and the vial is closed with a stopper and left at rest for at least 72 hours, following which the solution is discarded and the sample weight following immersion is measured. Using the Flory-Rehner equation, the crosslink density of the rubber composition is calculated from the sample weights before and after swelling.

$$\nu = -(\ln(1-v_r) + v_r + \chi v_r^2)/V_s(v_r^{1/3} - v_r/2)$$

(where $\nu$ is the crosslink density, $v_r$ is the volume fraction of rubber in the swollen sample, $\chi$ is an interaction coefficient, and $V_s$ is the molar volume of toluene)

$$v_r = V_{BR}/(V_{BR} + V_T)$$

$$V_{BR} = (w_f - w_f v_f)/\rho$$

$$V_T = (w_s - w_f)/\rho_T$$

(where $V_{BR}$ is the volume of butadiene rubber in the rubber composition, $V_T$ is the volume of toluene in the swollen sample, $v_f$ is the weight fraction of filler in the rubber composition, $\rho$ is the density of the rubber composition, $w_f$ is the sample weight before immersion, $w_f$ is the sample weight after immersion, and $\rho_T$ is the density of toluene)

Calculation is carried out at a $V_s$ value of $0.1063 \times 10^{-3}$ m$^3$/mol, a $\rho_T$ value of 0.8669, and at a value for $\chi$, based on the literature (*Macromolecules* 2007, 40, 3669-3675), of 0.47.

Next, the product P×E of the difference in crosslink density P (mol/m$^3$) between the core surface and the core center, expressed as (crosslink density at core surface)−(crosslink density at core center), multiplied by the deflection E (mm) of the core when compressed under a final load of 1,275 N (130 kgf) from an initial load state of 98 N (10 kgf) is explained. Generally, as the core hardness becomes higher, i.e., as the core deflection E (mm) becomes smaller, the difference P (mol/m$^3$) in crosslink density tends to become larger. By multiplying P by E as described above, the influence of the core hardness can be canceled out, enabling the value P×E to serve as an indicator of the reduction in spin rate. The P×E value is preferably at least $26\times10^2$ mol/m$^3$·mm, more preferably at least $27\times10^2$ mol/m$^3$·mm, and even preferably at least $28\times10^2$ mol/m$^3$·mm. As explained above, with the emergence of a difference in crosslink density between the core center and the core surface, a golf ball can be obtained which has a lower spin rate, a higher durability and also, even with use over an extended period of time, no decline in initial velocity.

Next, the cover of one layer or a plurality of layers encasing the core is described.

The cover material is not particularly limited, although use can be made of known materials such as various ionomeric resins and urethane elastomers that are used in golf balls.

To achieve an even further spin rate-lowering effect, it is especially preferable to use a highly neutralized ionomeric material in the layer adjoining the core. Specifically, the use of a material formulated from components (a) to (d) below is preferred:

100 parts by weight of a resin component obtained by blending
- (a) a base resin containing
  - (a-1) an olefin-unsaturated carboxylic acid random copolymer and/or a metal ion neutralization product of an olefin-unsaturated carboxylic acid random copolymer, and
  - (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio of from 100:0 to 0:100 with
- (b) a non-ionomeric thermoplastic elastomer in a weight ratio of from 100:0 to 50:50;
- (c) from 5 to 80 parts by weight of a fatty acid and/or fatty acid derivative having a molecular weight of between 228 and 1500; and
- (d) from 0.1 to 17 parts by weight of a basic inorganic metal compound capable of neutralizing un-neutralized acid groups on components (a) and (c).

In cases where a mixed material of above components (a) to (d) is used, it is especially preferable to use a mixed material in which at least 70% of the acid groups are neutralized.

The material making up the outermost layer of the cover is preferably one composed primarily of a urethane material, and especially a thermoplastic urethane elastomer.

In addition, one, two or more intermediate cover layers may be formed between the cover layer adjoining the core and the outermost cover layer. In such a case, it is preferable for the intermediate layer material to be a thermoplastic resin such as an ionomer.

To obtain the cover in this invention, use may be made of, for example, a method that involves placing a single-layer core or a multilayer core of two or more layers that has been prefabricated according to the type of ball within a mold, mixing and melting the above mixture under applied heat, and injection-molding the molten mixture over the core so as to encase the core with the desired cover. In this case, cover production can be carried out in a state where excellent thermal stability, flowability and processability have been achieved. As a result, the golf ball ultimately obtained has a high rebound, and moreover has a good feel at impact and an excellent scuff resistance. Alternatively, use may be made of a cover-forming method other than the foregoing, such as one in which, for example, a pair of hemispherical half-cups are molded beforehand from the cover material of the invention, following which the core is enclosed within the half-cups and molding is carried out under applied pressure at 120 to 170° C. for 1 to 5 minutes.

The thicknesses of the respective layers making up the cover (cover layers), although not particularly limited, are preferably from 1.0 to 2.0 mm, more preferably from 1.1 to 1.8 mm, and even more preferably from 1.3 to 1.6 mm. When the cover is thicker than the above range, the initial velocity of the ball may decrease and the spin rate may rise, as a result of which a good distance may not be achieved. On the other hand, when the cover is too thin, the durability to cracking on repeated impact may worsen or the spin rate may rise, as a result of which a good distance may not be achieved.

The Shore D hardnesses of the respective layers making up the cover (cover layers), although not particularly limited, are preferably from 50 to 61, more preferably from 53 to 59, and even more preferably from 55 to 57.

The surface hardness (Bs) of the sphere encased by the cover (outermost layer), i.e., the ball, is not particularly limited. Expressed in terms of Shore D hardness, this hardness is preferably from 57 to 68, more preferably from 60 to 66, and even more preferably from 62 to 64. Expressed in terms of JIS-C hardness, this hardness is preferably from 86 to 100, more preferably from 89 to 97, and even more preferably from 92 to 95. When the surface hardness of the ball is lower than these ranges, the spin rate on full shots may be high or the initial velocity of the ball may be low, as a result of which the desired distance may not be achieved. On the other hand, when the surface hardness is higher than this range, the feel at impact in the short game may become hard or the durability to cracking on repeated impact may worsen.

The deflection of the sphere encased by the cover (outermost layer), i.e., the ball, when compressed under a final load of 1,275 N (130 kgf) from an initial load of 98 N (10 kgf), although not particularly limited, is preferably from 3.6 to 5.0 mm, preferably from 3.8 to 4.6 mm, and even more preferably from 4.0 to 4.3 mm. When this value is too large, the feel of the ball at impact may lack crispness, or the durability to cracking on repeated impact may worsen. On the other hand, when this value is too small, the feel may become too hard and the spin on full shots may rise, as a result of which the intended distance may not be achieved.

Numerous dimples are formed on the surface of the outermost layer of the cover, in addition to which the cover may be subjected to various types of treatment, such as surface preparation, stamping and painting. Particularly in cases where such surface treatment is imparted to the cover formed of the inventive cover material, the good moldability of the cover surface enables the treatment operations to be carried out effectively.

To conform to R&A rules, the initial velocity of the ball has an upper limit of not more than 77.724 m/s and a lower limit of preferably not less than 76.0 m/s, more preferably not less than 76.5 m/s, and even more preferably not less than 77.0 m/s. When this initial velocity value is too low, the initial velocity on shots with a driver (W#1) becomes low, as a result of which the intended distance may not be obtained. The method of measuring the initial velocity of the ball is the same as the method described above for measuring the initial velocity of the core.

Next, the golf ball of the invention preferably satisfies the following conditions.

(1) Relationship Between Deflection of Core Under Specific Loading and Cover Thickness The relationship between the deflection of the core under specific loading and the cover thickness is optimized in a specific range. That is, letting E be the deflection (mm) of the core when compressed under a final load of 1,275 N (130 kgf) from an initial load of 98 N (10 kgf) and C be the cover thickness (mm), the value E/C is preferably from 2.7 to 3.9, more preferably from 2.9 to 3.8, and even more preferably form 3.0 to 3.6. When this value is too large, the durability to cracking under repeated impact may worsen. On the other hand, when this value is too small, the spin rate on full shots may end up rising and the initial velocity of the ball may decrease, as a result of which the intended distance on shots with a driver (W#1) may not be achieved.

(2) Relationship Between Core Diameter and Cover Thickness

The relationship between the core diameter and the cover thickness is optimized within a specific range.

That is, letting D be the core diameter (mm) and C be the cover thickness (mm), the value D/C is preferably from 24 to 41, more preferably from 25 to 35, and even more preferably from 26 to 30. When this value is too large, the durability to cracking on repeated impact may worsen. On the other hand, when this value is too small, the ball initial velocity may decrease, as a result of which the intended distance on shots with a driver (W#1) may not be obtained.

(3) Relationship Between Deflections of Core and Ball Under Specific Loading

The relationship between the deflections of the core and the ball under specific loading is optimized within a specific range. That is, letting E and B be the deflections (mm) of, respectively, the core and the ball when compressed under a final load of 1,275 N (130 kgf) from an initial load of 98 N (10 kgf), the value E/B is preferably from 1.05 to 1.25, more preferably from 1.08 to 1.22, and even more preferably from 1.10 to 1.20. When this value is too large, the ball initial velocity may become low, as a result of which the intended distance may not be achieved. Moreover, the durability to cracking on repeated impact may worsen. On the other hand, when this value is too small, the spin rate on full shots may rise, as a result of which the intended distance may not be obtained. The value E−B is preferably from 0.3 to 1.0 mm, more preferably from 0.4 to 0.9 mm, and even more preferably form 0.5 to 0.8 mm. When this value is too large, the durability to cracking on repeated impact may worsen. On the other hand, when this value is too small, the spin rate on full shots may rise, as a result of which the intended distance may not be achieved.

(4) Relationship Between Ball Surface Hardness and Core Surface Hardness

The value obtained by subtracting the core surface hardness (Cs) from the ball surface hardness (Bs), i.e., the value (Bs)−(Cs), expressed in terms of Shore D hardness, is preferably from 1 to 25, more preferably from 5 to 22, and even more preferably from 10 to 18. When this value is too large, the durability to cracking on repeated impact may worsen. On the other hand, when this value is too small, the spin rate on full shots may rise, as a result of which the intended distance may not be obtained.

This invention provides a golf ball in which the above-described rubber composition is used as a core material for at least one core layer. The type of golf ball is not particularly limited, provided the ball has a core and at least one cover layer. For example, the rubber composition may be used in the core of a solid golf ball, such as a two-piece or three-piece solid golf ball having a solid core encased by a cover or a multi-piece golf ball having a construction of three or more layers, or as the core in a wound golf ball composed of a wound core encased by a single layer cover or a cover having a multilayer construction of two or more layers.

As described above, the golf ball of the invention uses a core material which undergoes little decrease in resilience over time and little energy loss. Moreover, this golf ball, by optimizing the compression and the hardness profile of the core, enables a good distance to be achieved on shots with a driver (W#1) and a good, soft feel at impact to be obtained, even when the ball is played by users whose head speed is not very fast, such as senior golfers and women golfers.

EXAMPLES

Examples of the invention and Comparative Examples are given below by way of illustration, although the invention is not limited by the following Examples.

Examples 1 and 2, Comparative Examples 1 to 4

Formation of Cores

Solid cores for the respective Working Examples and Comparative Examples were produced by preparing the rubber compositions shown in Table 1, then molding and vulcanizing under the vulcanization conditions shown in the same table.

TABLE 1

|  | Example | | Comparative Example | | | |
| --- | --- | --- | --- | --- | --- | --- |
| Core formulation (pbw) | 1 | 2 | 1 | 2 | 3 | 4 |
| Polybutadiene A |  |  | 80 | 80 |  |  |
| Polybutadiene B | 100 | 100 | 20 | 20 | 100 | 100 |
| Zinc acrylate | 30.5 | 28.0 | 24.4 | 23.0 | 35.5 | 35.5 |
| Organic peroxide (1) | 1.0 | 1.0 |  |  | 1.0 | 1.0 |
| Organic peroxide (2) |  |  | 2.5 | 2.5 |  |  |
| Water | 0.8 | 0.8 |  |  | 0.8 | 0.8 |
| Antioxidant | 0.1 | 0.1 | 0.1 | 0.1 | 0.1 | 0.1 |
| Barium sulfate | 14.5 | 15.7 | 16.4 | 16.9 | 12.6 | 15.4 |
| Zinc oxide | 4 | 4 | 4 | 4 | 4 | 4 |
| Zinc salt of pentachlorothiophenol | 1.0 | 1.0 | 0.8 | 0.8 | 1.0 | 1.0 |
| Vulcanization conditions Temperature (° C.) | 156 | 156 | 156 | 156 | 156 | 156 |
| Time (minutes) | 15 | 15 | 15 | 15 | 15 | 15 |

Details on the ingredients in Table 1 are given below.

Polybutadiene A: Available from JSR Corporation under the trade name "BR 01"

Polybutadiene B: Available from JSR Corporation under the trade name "BR 51"

Organic Peroxide (1): Dicumyl peroxide, available from NOF Corporation under the trade name "Percumyl D"

Organic Peroxide (2): A mixture of 1,1-di(t-butylperoxy)-cyclohexane and silica, available from NOF Corporation under the trade name "Perhexa C-40"

Water: Distilled water, from Wako Pure Chemical Industries, Ltd.

Antioxidant: 2,2'-Methylenebis(4-methyl-6-butylphenol), available from Ouchi Shinko Chemical Industry Co., Ltd. under the trade name "Nocrac NS-6"

Barium sulfate: Available under the trade name "Barico #300" (Hakusui Tech Co., Ltd.)

Zinc oxide: Available under the trade name "Zinc Oxide Grade 3" (Sakai Chemical Co., Ltd.)

Each of the cores produced as described above was evaluated for deformation under specific loading, hardness profile, moisture content, crosslink density and core initial velocity. The results are shown in Tables 3 and 4.

Deflection of the Core Under Specific Loading

The deflection by the core when compressed under a final load of 1,275 N (130 kgf) from an initial load state of 98 N (10 kgf) was measured. The average values for 30 cores (n=30) are shown in Tables 3 and 4.

Core Hardness Profile

The indenter of a durometer was set so as to be substantially perpendicular to the spherical surface of the core, and the core surface hardness in terms of JIS-C hardness was measured as specified in JIS K6301-1975.

To obtain the cross-sectional hardnesses at the center and other specific positions of the core, the core was hemispherically cut so as form a planar cross-section, and measurements were carried out by pressing the indenter of a durometer perpendicularly against the cross-section at the measurement positions. These hardnesses are indicated as JIS-C hardness values.

The Shore D hardnesses at the core center and core surface were measured with a type D durometer in accordance with ASTM D2240-95.

Core Moisture Content

Measurement of the moisture content was carried out at using the AQ-2100 coulometric Karl Fischer titrator and the EV-2000 evaporator (both available from Hiranuma Sangyo Corporation) at a measurement temperature of 130° C., a preheating time of 3 minutes and a background measurement time of 30 seconds. The Interval Time was set to 99 seconds, and the Current was set to "Fast." Measurement results within a radius of 5 mm from the core center were treated as core center moisture contents, and measurement results within 5 mm of the core surface were treated as core outside moisture contents.

Crosslink Density of Core (Toluene Swelling Test)

A flat disk having a thickness of 2 mm was cut out by passing through the geometric center of the core. Next, using a punching machine, samples having a diameter of 3 mm were punched from the flat disk at the places of measurement, and the sample weights were measured using an electronic balance capable of measurement in units of two decimal places (mg). The sample and 8 mL of toluene were added to a 10 mL vial, following which the vial was closed with a stopper and left at rest. After 72 hours had elapsed, the liquid within the vial was discarded and the sample weight following immersion was measured. Using the Flory-Rehner equation, the crosslink density of the rubber composition was calculated from the sample weights before and after swelling.

$$\nu = -(\ln(1-v_r) + v_r + \chi v_r^2)/V_s(v_r^{1/3} - v_r/2)$$

(where $\nu$ is the crosslink density, $v_r$ is the volume fraction of rubber in the swollen sample, $\chi$ is an interaction coefficient, and $V_s$ is the molar volume of toluene)

$$v_r = V_{BR}/(V_{BR} + V_T)$$

$$V_{BR} = (w_f - w_f v_f)/\rho$$

$$V_T = (w_s - w_f)/\rho_T$$

(where $V_{BR}$ is the volume of butadiene rubber in the rubber composition, $V_T$ is the volume of toluene in the swollen sample, $v_f$ is the weight fraction of filler in the rubber composition, $\rho$ is the density of the rubber composition, $w_f$ is the sample weight before immersion, $w_s$ is the sample weight after immersion, and $\rho_T$ is the density of toluene)

Calculation was carried out at a $V_s$ value of $0.1063 \times 10^{-3}$ m³/mol, a $\rho_T$ value of 0.8669, and at a value for $\chi$, based on the literature (*Macromolecules* 2007, 40, 3669-3675), of 0.47.

Next, for each of the cores produced as described above, a single-layer cover having the properties shown in Table 2 below was injection-molded over the core, thereby obtaining a two-piece solid golf ball. Although not shown in a diagram, dimples in a specific pattern common to each ball were formed on the surface of the ball cover in all of the Working Examples of the invention and the Comparative Examples.

TABLE 2

| Resin material (pbw) | I |
| --- | --- |
| Himilan 1557 | 37.5 |
| Himilan 1601 | 37.5 |
| Nucrel AN4319 | 25 |
| Titanium oxide | 3 |
| Magnesium stearate | 1 |
| Melt flow rate (MFR) | 6.5 |

Himilan: Ionomers available from DuPont-Mitsui Polychemicals Co., Ltd.

Nucrel: An ethylene-methacrylic acid copolymer available from DuPont-Mitsui Polychemicals Co., Ltd.

The properties of the golf balls in these Working Examples and Comparative Examples were evaluated as follows. The results are presented in Table 3.

Ball Diameter

The diameters at five random dimple-free areas were measured at a temperature of 23.9±1° C. and, using the average of these measurements as the measured value for a single ball, the average diameter for five measured balls was determined.

Core and Ball Deflections

A core or ball was placed on a hard plate and the amount of deflection when compressed under a final load of 1,275 N (130 kgf) from an initial load state of 98 N (10 kgf) was measured. The amount of deflection here refers in each case to the measured value obtained after holding the test specimen isothermally at 23.9° C.

Initial Velocities of Core and Ball

The initial velocities were measured using an initial velocity measuring apparatus of the same type as the USGA drum rotation-type initial velocity instrument approved by the R&A. The cores and balls (referred to below as "spherical test specimens") were held isothermally in a 23.9±1° C. environment for at least 3 hours, and then tested in a chamber at a room temperature of 23.9±2° C. Each test specimen was hit using a 250-pound (113.4 kg) head (striking mass) at an impact velocity of 143.8 ft/s (43.83 m/s). One dozen spherical test specimens were each hit four times. The time taken for the test specimen to traverse a distance of 6.28 ft (1.91 m) was measured and used to compute the initial velocity (m/s). This cycle was carried out over a period of about 15 minutes.

Material Hardness of Cover (Shore D Hardness)

The cover-forming resin material was molded into a sheet having a thickness of 2 mm and left to stand for at least two weeks, following which the Shore D hardness was measured in accordance with ASTM D2240-95.

Surface Hardness of Ball (Shore D Hardness)

Measurements were taken by pressing the durometer indenter perpendicularly against the surface of the ball (i.e., the surface of the cover). The surface hardness of the ball (cover) is the measured value obtained at dimple-free places (lands) on the ball surface. The Shore D hardness was measured with a type D durometer in accordance with ASTM D2240-95.

In addition, the flight performance (W#1) and feel on impact of the golf balls in the respective Working Examples and Comparative Examples were evaluated according to the following criteria. The results are shown in Table 4.

Flight Performance (W#1 Shots)

A driver (W#1) was mounted on a golf swing robot and the distance traveled by the ball when struck at a head speed (HS) of 35 m/s was measured, based on which the flight performance was rated according to the criteria shown below. The club was a Tour Stage PHYZ driver (2011 model; loft angle, 11.5°) manufactured by Bridgestone Sports Co., Ltd. The ball immediately after being struck was measured with an apparatus for measuring the initial conditions.

[Rating Criteria]
Good: Total distance was 166.0 m or more
NG: Total distance was less than 166.0 m Feel of Ball Using a W#1 golf club, sensory evaluations were carried out under the following criteria by ten users having head speeds of 30 to 40 m/s.

Good: Seven or more of the ten users experienced a good feel at impact
Fair: Four to six of the ten users experienced a good feel at impact
NG: Three or fewer of the ten users experienced a good feel at impact

TABLE 3

| | | | Example | | Comparative Example | | | |
|---|---|---|---|---|---|---|---|---|
| | | | 1 | 2 | 1 | 2 | 3 | 4 |
| Core | Construction | | 2-piece rubber | 2-piece rubber | 2-piece rubber | 2-piece rubber | 2-piece rubber | 2-piece rubber |
| | Material | | | | | | | |
| | Diameter (D), mm | | 39.7 | 39.7 | 39.7 | 39.7 | 39.7 | 38.5 |
| | Weight, g | | 37.8 | 37.8 | 37.8 | 37.8 | 37.8 | 35.0 |
| | Deflection (E), mm | | 4.70 | 5.00 | 4.45 | 4.75 | 4.10 | 4.10 |
| | Initial velocity, m/s | | 77.9 | 77.9 | 77.9 | 77.9 | 77.9 | 77.9 |
| | Center hardness, Shore D | | 34 | 33 | 36 | 35 | 35 | 35 |
| | Hardness profile (JIS-C) | Center hardness (Cc) | 55 | 54 | 58 | 56 | 56 | 56 |
| | | Hardness at position 5 mm from center (C5) | 58 | 57 | 63 | 61 | 59 | 59 |
| | | Hardness at position 10 mm from center (C10) | 58 | 57 | 63 | 61 | 61 | 61 |
| | | Hardness at position 15 mm from center (C15) | 68 | 67 | 67 | 66 | 75 | 75 |
| | | Surface hardness (Cs) | 79 | 78 | 77 | 75 | 83 | 83 |
| | | C5 − Cc | 3 | 3 | 5 | 5 | 3 | 3 |
| | | C10 − Cc | 3 | 3 | 5 | 5 | 5 | 5 |
| | | C10 − C5 | 0 | 0 | 0 | 0 | 2 | 2 |
| | | C15 − C10 | 10 | 10 | 4 | 5 | 14 | 14 |
| | | Cs − C10 | 21 | 21 | 14 | 14 | 22 | 22 |
| | | Cs − C15 | 11 | 11 | 10 | 9 | 8 | 8 |
| | | Surface − Center (Cs − Cc) | 24 | 24 | 19 | 19 | 27 | 27 |
| | Surface hardness (Cs), Shore D | | 52 | 51 | 51 | 49 | 55 | 55 |
| | Core moisture content (ppm) | Center | 1970 | 1954 | 945 | 847 | 1941 | 1950 |
| | | Surface | 1789 | 1789 | 1828 | 1725 | 1786 | 1789 |
| | | Surface − Center | −181 | −165 | 883 | 878 | −155 | −161 |
| | Crosslink density (×10² mol/m³) | Center | 6.6 | 6.3 | 9.4 | 8.6 | 8.5 | 8.5 |
| | | Outside | 15.8 | 15.3 | 14.5 | 13.6 | 19.1 | 19.2 |
| | | Outside − Center (P) | 9.2 | 9.0 | 5.1 | 5.0 | 10.6 | 10.7 |
| | P × E (×10² mol/m³ · mm) | | 43.2 | 45.0 | 22.7 | 23.8 | 43.5 | 43.9 |
| Cover | Material | | I | I | I | I | I | I |
| | Thickness (C), mm | | 1.5 | 1.5 | 1.5 | 1.5 | 1.5 | 2.1 |
| | Specific gravity | | 0.982 | 0.982 | 0.982 | 0.982 | 0.982 | 0.982 |
| | Material hardness, Shore D | | 56 | 56 | 56 | 56 | 56 | 56 |
| Ball | Diameter, mm | | 42.7 | 42.7 | 42.7 | 42.7 | 42.7 | 42.7 |
| | Weight, g | | 45.5 | 45.5 | 45.5 | 45.5 | 45.5 | 45.5 |
| | Deflection (B), mm | | 4.12 | 4.25 | 4.00 | 4.15 | 3.83 | 3.72 |
| | Initial velocity, m/s | | 77.3 | 77.3 | 77.3 | 77.3 | 77.3 | 76.7 |
| | Surface hardness (Bs), Shore D | | 63 | 63 | 63 | 63 | 63 | 63 |
| | Surface hardness, JIS-C | | 93 | 93 | 93 | 93 | 93 | 93 |
| | Core deflection (E)/Cover thickness (C) | | 3.1 | 3.3 | 3.0 | 3.2 | 2.7 | 2.0 |
| | Core deflection (E)/Ball deflection (B) | | 1.14 | 1.18 | 1.11 | 1.14 | 1.07 | 1.1 |
| | Ball surface hardness (Bs) − Core surface hardness (Cs) | | 11 | 12 | 12 | 14 | 8 | 8 |
| | Core diameter (D)/Cover thickness (C) | | 26.5 | 26.5 | 26.5 | 26.5 | 26.5 | 18.3 |
| | Core deflection (E) − Ball deflection (B) (mm) | | 0.58 | 0.75 | 0.45 | 0.6 | 0.27 | 0.38 |

TABLE 4

| | | Example | | Comparative Example | | | |
|---|---|---|---|---|---|---|---|
| | | 1 | 2 | 1 | 2 | 3 | 4 |
| Flight performance (W#1; HS, 35 m/s) | Spin rate (rpm) | 2,621 | 2,561 | 2,772 | 2,712 | 2,741 | 2,870 |
| | Total distance (m) | 165.5 | 166.1 | 164.3 | 164.7 | 164.5 | 163.9 |
| | Rating | good | good | NG | NG | NG | NG |
| Feel | Rating | good | good | good | good | NG | NG |

From the results in Table 4 above, it is apparent that the golf balls according to the Working Examples of the invention, on shots with a driver, all had an increased total distance due to a lowered spin rate, and moreover had an excellent feel at impact.

By contrast, in Comparative Example 1, because the core hardness profile was not optimal, the spin rate on shots with a driver (W#1) rose and a good distance was not achieved.

In Comparative Example 2, because the core hardness profile was not optimal, the spin rate on shots with a driver (W#1) rose and a good distance was not achieved.

In Comparative Example 3, the surface hardness of the core was high, resulting in a hard feel at impact.

In Comparative Example 4, the surface hardness of the core was high, resulting in a hard feel at impact.

The invention claimed is:

1. A golf ball comprising a core and a cover of one layer or a plurality of layers, wherein the core is formed of a material molded under heat from a rubber composition comprising the following components A to C:
   (A) a base rubber,
   (B) an organic peroxide, and
   (C) water and/or a metal monocarboxylate,
   and has a hardness profile which, letting Cc be a JIS-C hardness at a center of the core, C10 be a JIS-C hardness at a position 10 mm from the core center and Cs be a JIS-C hardness at a surface of the core, satisfies the following conditions (1) to (3):
   (1) $0 \leq C10-Cc \leq 10$
   (2) $C10-Cc < Cs-C10$
   (3) $20 \leq Cs-C10$
   with the proviso that Cc is at least 50 and Cs is not more than 80,
   wherein the core, following vulcanization, has a higher moisture content at the core center than at the core surface.

2. The golf ball of claim 1, wherein the core has a deflection E when compressed under a final load of 1,275 N (130 kgf) from an initial load state of 98 N (10 kgf) of at least 4.4 mm, and the ball has a deflection B when compressed under a final load of 1,275 N (130 kgf) from an initial load state of 98 N (10 kgf) of at least 3.8 mm.

3. The golf ball of claim 2, wherein a value E/B is at least 1.08 and not more than 1.20.

4. The golf ball of claim 1, wherein a value obtained by dividing a deflection E (mm) of the core when compressed under a final load of 1,275 N (130 kgf) from an initial load state of 98 N (10 kgf) by a thickness C (mm) of the cover, which value is expressed as E/C, is at least 2.7 and not more than 3.9.

5. The golf ball of claim 1, wherein a relationship between a diameter D (mm) of the core and a thickness C (mm) of the cover, expressed as a value D/C, is at least 20.

6. The golf ball of claim 1, wherein a relationship between a diameter D (mm) of the core and a thickness C (mm) of the cover, expressed as a value D/C, is at least 24 and not more than 41.

7. The golf ball of claim 1 wherein, in a core hardness profile, a difference between the JIS-C hardnesses at the core surface and the core center, expressed as a value Cs−Cc, is at least 21.

8. The golf ball of claim 1, wherein a difference between the crosslink density at the core surface and a crosslink density at the core center, both of which are crosslink densities measured based on a toluene swelling test, is at least $8.0 \times 10^2$ mol/m$^3$.

9. The golf ball of claim 1, wherein a product P×E of a difference P (mol/m$^3$) in crosslink density between the core surface and the core center, as measured based on a toluene swelling test, multiplied by a deflection E (mm) of the core when compressed under a final load of 1,275 N (130 kgf) from an initial load state of 98 N (10 kgf) is at least $28 \times 10^2$ mol/m$^3$·mm.

10. The golf ball of claim 1, wherein the component C is water and an amount of water included per 100 parts by weight of the base rubber serving as component A is from 0.1 to 5 parts by weight.

11. The golf ball of claim 1, wherein the component C is a metal monocarboxylate and an amount of metal monocarboxylate included per 100 parts by weight of the base rubber serving as component A is from 1 to 60 parts by weight.

12. The golf ball of claim 1, wherein a value obtained by subtracting the core surface hardness (Cs) from the ball surface hardness (Bs), expressed in terms of Shore D hardness, is from 1 to 25.

13. A golf ball comprising a core and a cover of one layer or a plurality of layers, wherein the core is formed of a material molded under heat from a rubber composition comprising the following components A to C:
   (A) a base rubber,
   (B) an organic peroxide, and
   (C) water and/or a metal monocarboxylate,
   and has a hardness profile which, letting Cc be the JIS-C hardness at a center of the core, C10 be the JIS-C hardness at a position 10 mm from the core center and Cs be the JIS-C hardness at a surface of the core, satisfies the following conditions (1) to (3):
   (1) $0 \leq C10-Cc \leq 10$
   (2) $C10-Cc < Cs-C10$
   (3) $20 \leq Cs-C10$
   with the proviso that Cc is at least 50 and Cs is not more than 80;
   wherein the difference between the crosslink density at the core surface and the crosslink density at the core center, both of which are crosslink densities measured based on a toluene swelling test, is at least $8.0 \times 10^2$ mol/m$^3$.

14. The golf ball of claim 13, wherein the core has a deflection E when compressed under a final load of 1,275 N (130 kgf) from an initial load state of 98 N (10 kgf) of at least 4.4 mm, and the ball has a deflection B when compressed under a final load of 1,275 N (130 kgf) from an initial load state of 98 N (10 kgf) of at least 3.8 mm.

15. The golf ball of claim 14, wherein a value E/B is at least 1.08 and not more than 1.20.

16. The golf ball of claim 13, wherein a value obtained by dividing a deflection E (mm) of the core when compressed under a final load of 1,275 N (130 kgf) from an initial load state of 98 N (10 kgf) by a thickness C (mm) of the cover, which value is expressed as E/C, is at least 2.7 and not more than 3.9.

17. The golf ball of claim 13, wherein a relationship between a diameter D (mm) of the core and a thickness C (mm) of the cover, expressed as a value D/C, is at least 20.

18. The golf ball of claim 13 wherein, in a core hardness profile, a difference between the JIS-C hardnesses at the core surface and the core center, expressed as a value Cs−Cc, is at least 21.

19. The golf ball of claim 13, wherein the core, following vulcanization, has a higher moisture content at the core center than at the core surface.

20. The golf ball of claim 13, wherein a product P×E of a difference P (mol/m$^3$) in crosslink density between the core surface and the core center, as measured based on a toluene swelling test, multiplied by a deflection E (mm) of the core when compressed under a final load of 1,275 N (130 kgf) from an initial load state of 98 N (10 kgf) is at least $28 \times 10^2$ mol/m$^3$·mm.

* * * * *